United States Patent [19]

Selker

[11] Patent Number: 5,570,268

[45] Date of Patent: Oct. 29, 1996

[54] STOWABLE WRIST REST FOR PORTABLE COMPUTERS

[75] Inventor: Edwin J. Selker, Palo Alto, Calif.

[73] Assignee: International Business Machines Corporation, Armonk, N.Y.

[21] Appl. No.: 363,510

[22] Filed: Dec. 23, 1994

[51] Int. Cl.$^6$ .............................. G06F 1/16; B43L 15/00
[52] U.S. Cl. ........................... 361/683; 400/715; 361/680
[58] Field of Search ..................... 361/679, 680, 361/681, 683; 248/118, 118.1, 118.3, 118.5, 918; 400/714, 715, 691; 364/708.1; G06F 1/16

[56] References Cited

U.S. PATENT DOCUMENTS

| | | | |
|---|---|---|---|
| 4,709,972 | 12/1987 | LaBudde et al. | 312/208 |
| 5,017,030 | 5/1991 | Crews | 400/485 |
| 5,056,743 | 10/1991 | Zwar et al. | 248/118 |
| 5,074,413 | 12/1991 | Ikuta et al. | 206/320 |
| 5,131,614 | 7/1992 | Garcia et al. | 248/118 |
| 5,147,090 | 9/1992 | Mandell et al. | 248/118.1 |
| 5,193,925 | 3/1993 | Foulke | 400/715 |
| 5,203,527 | 4/1993 | Rubey | 248/118 |
| 5,244,296 | 9/1993 | Jensen | 400/715 |
| 5,346,164 | 9/1994 | Allen | 248/118 |
| 5,375,800 | 12/1994 | Wilcox et al. | 248/118.1 |
| 5,443,320 | 8/1995 | Agata et al. | 400/715 |

FOREIGN PATENT DOCUMENTS

| | | | |
|---|---|---|---|
| 2172852 | 3/1986 | United Kingdom | G06F 3/02 |
| 2243337 | 4/1990 | United Kingdom . | |
| PCT/FI93/00142 | 4/1993 | WIPO | B41J 29/00 |
| PCT/GB93/01300 | 6/1993 | WIPO . | |

*Primary Examiner*—Bot L. Ledynh
*Assistant Examiner*—Lynn D. Feild
*Attorney, Agent, or Firm*—Baker, Maxham, Jester & Meador

[57] ABSTRACT

A stowable wrist support assembly for a portable computer of the type having a bottom housing with top and bottom surfaces connected by a vertical peripheral side surface and having a keyboard on the top surface extending to a front edge and a top housing pivotally mounted to a back edge of the bottom housing, the support assembly comprises a generally thin flat panel having generally planar top support surface, a rear edge formed with a lip for detachably engaging and latching behind a shoulder proximate the front edge of the lower housing, and a panel support member extending downward from beneath the panel for engaging a lower front edge of the lower housing for supporting the panel in an outward position substantially in the plane of the keyboard.

20 Claims, 5 Drawing Sheets

STOWABLE WRIST REST FOR PORTABLE COMPUTERS

BACKGROUND OF THE INVENTION

The present invention relates to portable computers and pertains particularly to an attachable, stowable wrist rest for portable computers.

Keyboards are widely used for inputting data into data processing systems. Those who extensively use keyboards are subject to repetitive motion strain injury, particularly carpal tunnel syndrome. This is a painful condition resulting from inflamed tendons and/or nerves within the tunnel formed by the wrist bones. Many approaches to alleviating this condition have been proposed in the past. These have included keyboard design and arm and wrist supports.

Many wrist supports have been proposed and are available for desk top keyboards. However, none of these are suitable for portable computers. Portable computers typically have a clamshell like case or housing with upper and lower sections hinged together along a back edge so that they open like a book. The lower housing contains the power supply and major electronics and the upper housing contains the screen. The lower housing is normally too thick to enable resting of the wrist on a supporting table top or the like. The keyboard is located on top of the lower housing and covered by the upper housing when closed. These computers vary in size (W×D×H) from about 15"×15"×2½" (portable size) to 12"×10"×2' (lap top) to 11"×8½"×1½" (notebook size). Sub-notebook computers are even smaller. The keyboards on all of these portable computers usually take up the entire top surface of the lower housing extending to the front edge. This leaves no room on the housing for wrist support.

Most of these portable computers are used on planes, trains, and other similar places which normally results in even less available support. Such places also typically present awkward situations that present an even greater demand for support of the wrists. Therefore, it is evident that there is a need for some means for wrist support for portable computer keyboards that is compact and effective and easily stowable.

SUMMARY OF THE INVENTION

It is the primary object of the present invention to provide means for wrist support for portable computer keyboards that is compact and effective and easily stowable.

In accordance with a primary aspect of the present invention, a stowable wrist support for a portable computer comprises a generally thin flat generally planar support member having a top support surface, a rear edge formed with a lip for engaging and detachably attaching to a front edge of a lower housing, and a brace disposed between a front surface of said front edge and a bottom edge of said support member for holding said support member in a generally horizontal wrist supporting position.

In accordance with another aspect of the invention, the support comprises a flexible sheet secured to a front edge of the lower housing and extendable outward for support, and slideably retractable beneath the housing for stowage with detent means for selectively holding it in an extended support position and a retracted position.

BRIEF DESCRIPTION OF THE PREFERRED EMBODIMENTS

The above and other objects of the present invention will become apparent from the following description when read in conjunction with the accompanying drawings wherein.

DETAILED DESCRIPTION OF THE PREFERRED EMBODIMENTS

Figure 1:
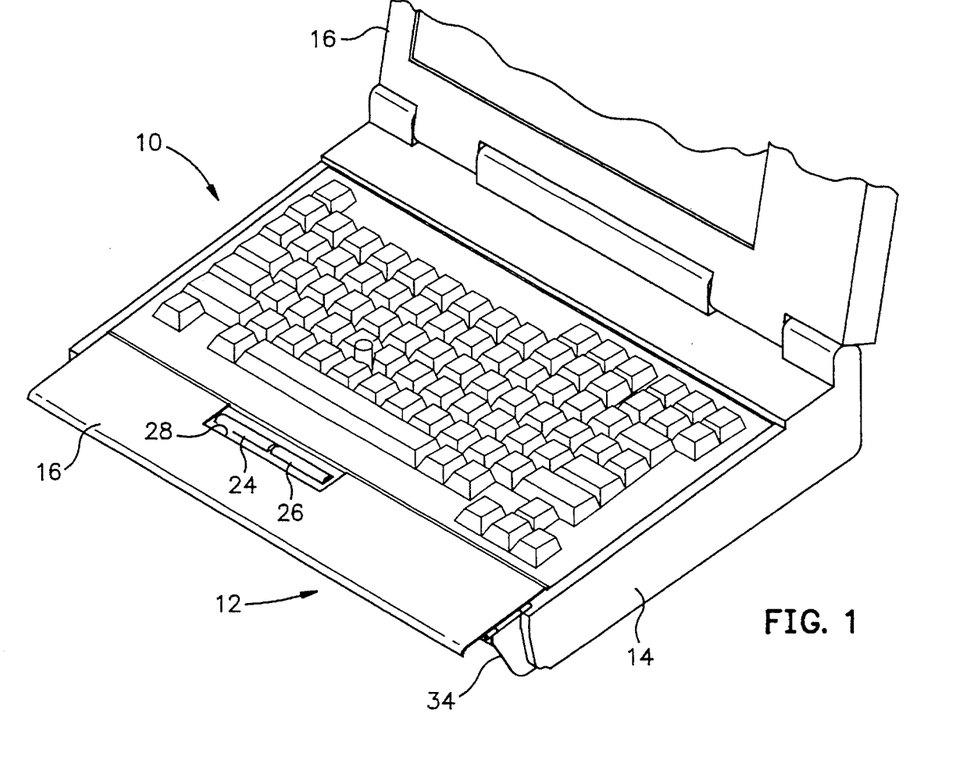
FIG. 1 is a perspective view illustrating a typical lap top computer equipped with a preferred embodiment of the present invention.

Referring to the drawings, particularly FIG. 1 there is illustrated a portable or lap top type computer designated generally by the numeral 10, having a wrist support designated generally by the numeral 12, in accordance with the invention attached to the front edge thereof. The lap top computer has a lower housing 14 which houses many of the components, such as the major electronics, the disc drive, battery pack and other major components. The lower housing is typically a box-like rectangular housing having an open top into which the keyboard rests. The keyboard is typically attached to a frame which rests inside the lower housing and to which is mounted the aforementioned components. In some computers the keyboard assembly pivots upward to provide access to the underside of the chassis.

A top housing, or cover 15, mounts the screen and is pivotally mounted along a back edge of the lower housing by suitable hinge structure. The top housing pulls down over the keyboard to close the housing and cover the keyboard.

Figure 3:
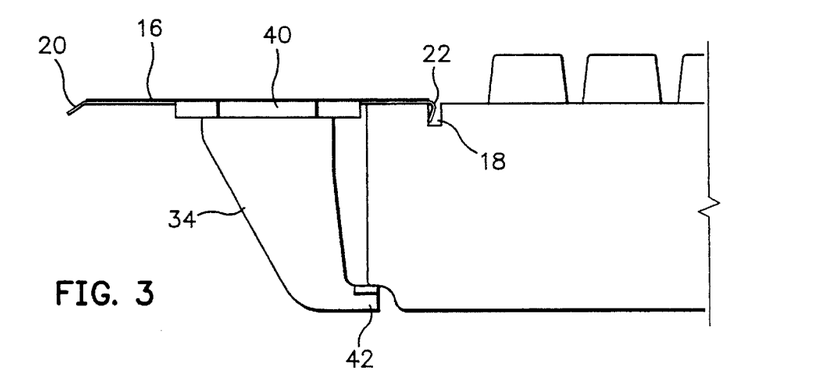
FIG. 3 is a side elevation view of the embodiment of FIG. 2.

The wrist rest, in accordance with the FIG. 1 embodiment, comprises an elongated, generally planar panel 16 having a rear or distal downturned lip 18 and a forward or proximal downturned lip 20. The lip 18 is formed to hook behind a shoulder or a rib, or into a transverse groove or slot that extends in front of the front edge of the keyboard typically or housing top, typically forward of the front row of keys of the keyboard and along an edge thereof. In some keyboards, there is an elongate depression of the keyboard bezel where it drops to the front row of keys. The lip 18 is intended to hook to any of these features. For example, on an IBM model 750 lap top computer, a shoulder 22 extends across in front of the keyboard colinearly with a pair of control buttons or bars 24 and 26 near the center thereof. As shown in FIG. 3, the lip 18 hooks behind the shoulder 22. The panel 16 includes a rectangular cutout 28 for accommodating the control buttons or bars 24, 26 on the IBM Model 750 lap top computer.

Figures 2, 4:
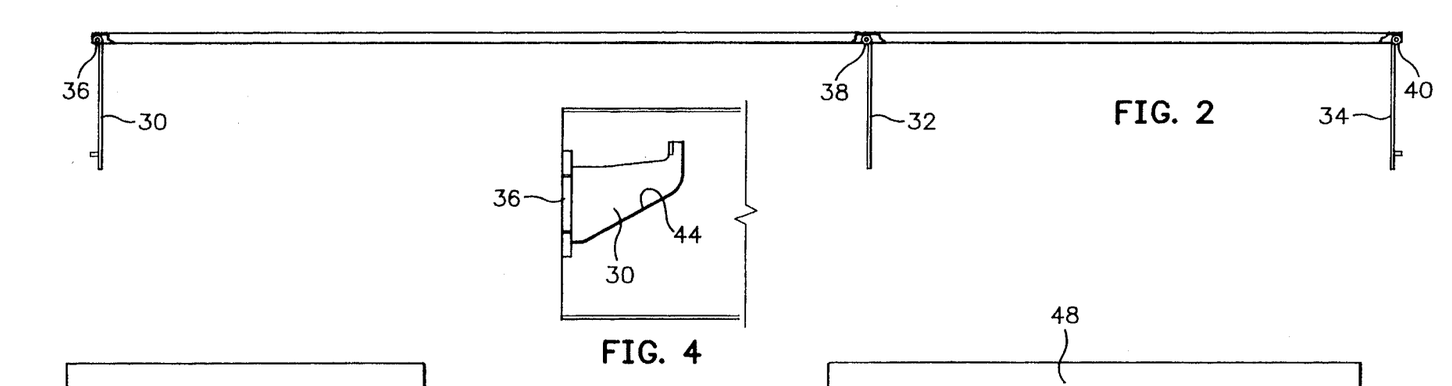
FIG. 2 is a front elevation view of the wrist support of FIG. 1.
FIG. 4 is a partial bottom view of a portion of the wrist support of FIG. 1 illustrating the storage of the braces of the embodiment of FIG. 1.

The panel 16 is provided with three downwardly depending legs or braces 30, 32 and 34, each hinged respectively, with hinges 36, 38 and 40 to an underside of the panel. The panel 16 is provided on the lower surface with recesses into which these legs or braces pivot for stowage. One such recess 35 is shown in FIG. 4. The legs or braces each extend downward and as shown with respect to brace 30, includes a forward extending finger or toe 42, which extends and latches beneath a bottom forward edge of the bottom of the computer, as shown in FIG. 3. As shown in FIG. 3, the wrist support is essentially latched to the front portion of the computer lower housing and is retained in place by the hook of the lip 18 and a forward finger of the braces.

The panel 16 is, preferably, made from 1.0 mm thick sheet metal, with a top layer of polycarbonate, 0.2 mm thick, laminated to it. The sheet metal is, preferably, formed by stamping, the stamping forming the pattern of the recesses 35 that accommodate the legs 30, 32, 34.

Figure 5:
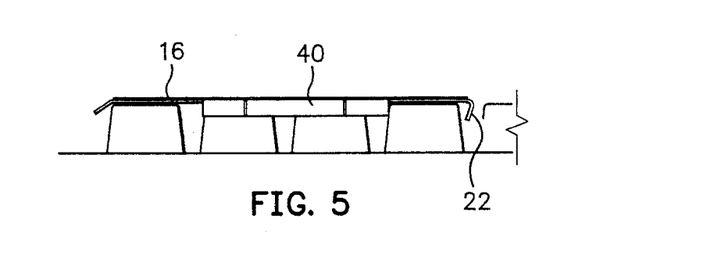
FIG. 5 is a side elevation view illustrating the embodiment of FIG. 1 stowed on the keyboard of a computer.

Referring to FIGS. 4 and 5, when the wrist rest is to be stowed, it is simply pulled upward at the outer edge, slipping the fingers of the legs from beneath the front lower edge of the computer housing and tilting the unit upward, releasing the attachment thereto. The legs or braces 30, 32 and 34 are then folded into the recesses such as the recess 35 in the bottom surface of the panel 16. The hinges 36, 38 and 40 are spaced so that they will fit between keys on the keyboard. Similarly, the downturned lips 18 and 20 are spaced so that they fit between keys on the keyboard. The panel is simply laid on the surface of the keyboard with the lips and hinges extending in spaces between the keyboard. The cover can then be closed and the rest is stowed with the unit and can be easily removed and snapped into place on the front of the computer lower housing previously explained.

Figure 6:
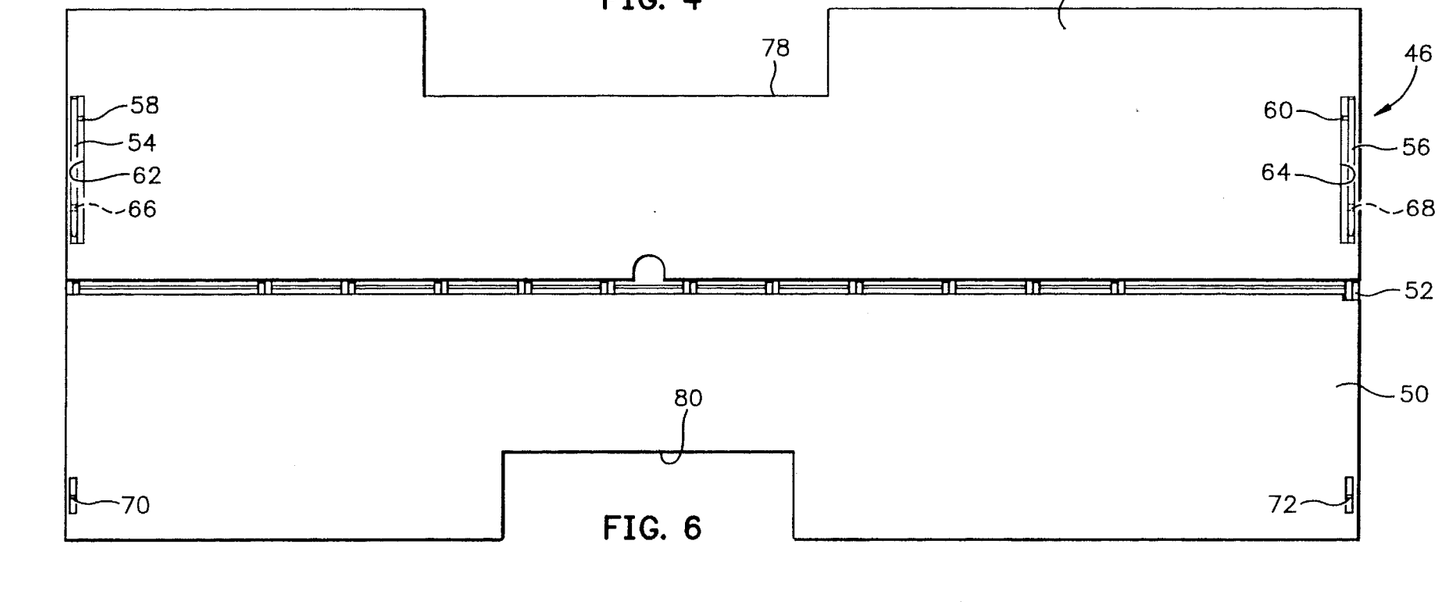
FIG. 6 is a top plan view of an alternate embodiment of the wrist support.
Figure 7:
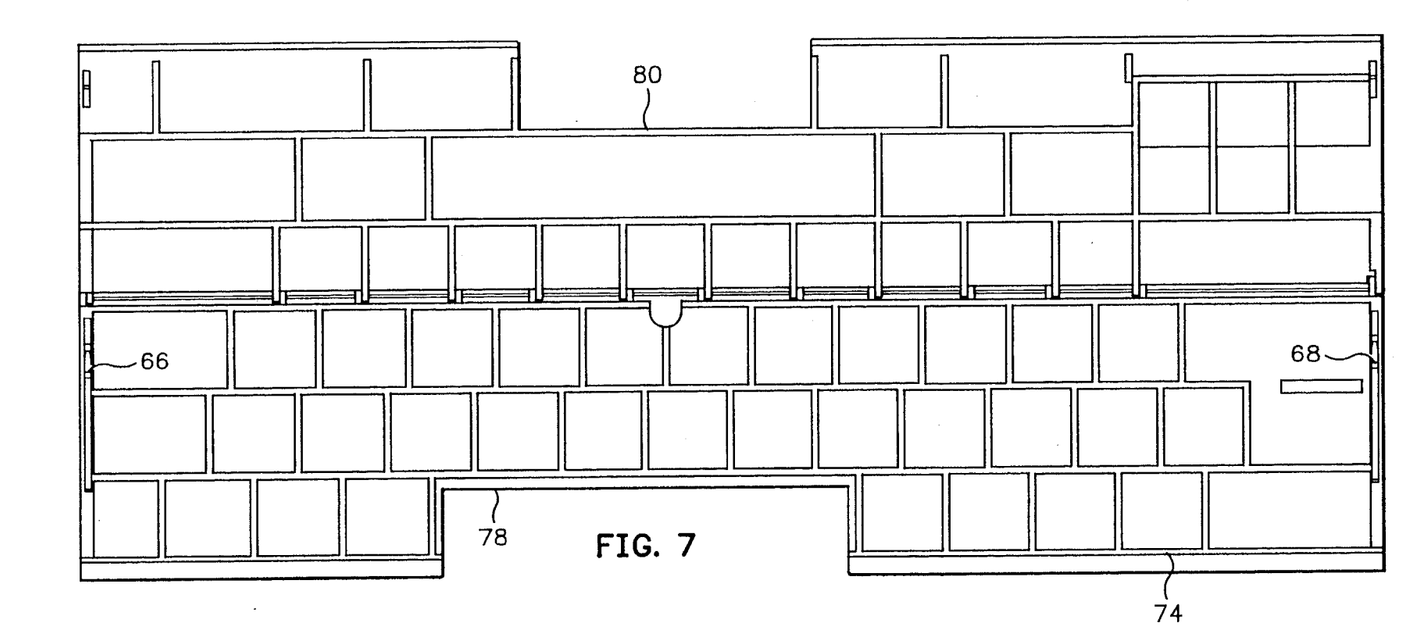
FIG. 7 is a bottom plan view of the embodiment of FIG. 6.

Referring now to FIGS. 6 and 7, an alternate embodiment is illustrated wherein the overall wrist support structure designated generally by the numeral 46 comprises a first or top panel 48 and a second or bottom panel 50, which are hinged together along a hinge 52. FIG. 6 illustrates the top plan view wherein the panel 48 has an upper surface that extends outward substantially in the plane of the keyboard and serves as the actual wrist support. The panel 50 pivots downward as will be subsequently described, to serve as bracing support structure to latch underneath the lower front edge of the computer housing as in the previous embodiment.

The bottom surface of the two panels as shown in FIG. 7 is a recessed image of the keyboard with recesses formed between ridges or ribs to receive the keys so that the overall support structure can be easily stowed, simply by laying on top of the keyboard. The overall structure can be a very thin panel with the ridges or bibs positioned to extend between adjacent keys on the keyboard so that minimal vertical space, which may be 0.2 mm or less is taken up vertically on the keyboard. Thus, the cover or upper housing of the computer can be easily closed with the support easily accommodated.

A pair of link members 54 and 56 are pivotally mounted and recessed in a slot at each side, respectively, of the upper panel 48. The links are each pivotally mounted such as by pins 58 and 60, within a slot 62 and 64 in the upper panel. The pins or links 54 and 58 each have a hook slot 66 and 68 at the opposite ends of the link from the pivot pins for engaging and hooking pins 70 and 72 in slots at the outer edge of the lower panel 50. The hook slots 66 and 68 may be on either the top or bottom of the links.

Figure 8:
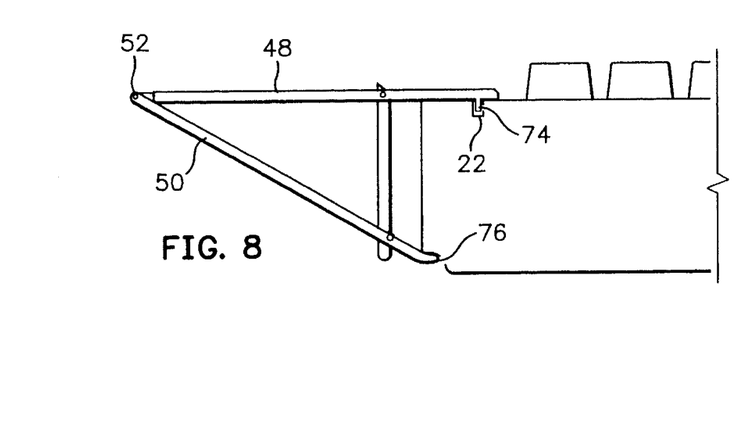
FIG. 8 is a side elevation view of the embodiment of FIG. 6 installed on a computer.

As shown in FIG. 8, these links 54 and 56 and pins 70 and 72 latch the two panels 48 and 52 into a partially folded triangular configuration as shown in FIG. 8. As shown in FIGS. 7 and 8, the undersurface of the upper panel 48 is provided with a transverse rib or hook 74 which extends downward into the recess 22 along the top front edge of the computer lower housing 14. The lower panel 50 has a outer edge 76 which extends downward and latches underneath the lower front edge portion of the lower housing 14 as in the previous embodiment. The wrist support is then simply latched into its operative position as shown in FIG. 8 for supporting the wrist of a keyboard operator during the input.

Figure 9:
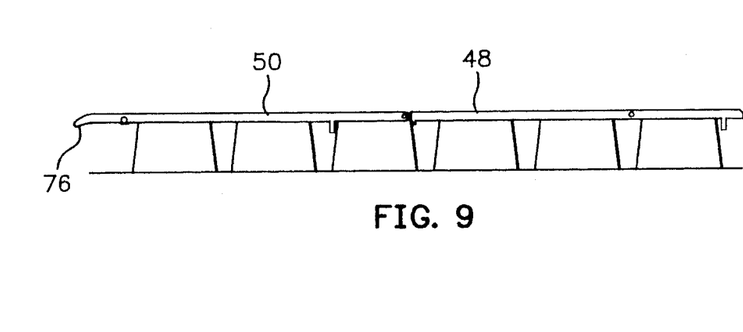
FIG. 9 is a side elevation view illustrating the embodiment of FIG. 6 stowed on the keyboard of a computer.

The wrist support assembly as shown in FIG. 8 is simply removed by pulling upward at the outer edge tilting the assembly counterclockwise, pulling the lower edge 76 away from the bottom lower edge of the computer housing and unlatching it from the computer housing. The links 54 and 56 are then unlatched from their position enabling the two panels to lie flat as shown in FIG. 9 where it is then stowed by placing it on top of the computer keyboard, registering with the keys so that they fit within the recesses in the bottom of the two panels. The support as shown in FIG. 9 then takes up very little space and enables the top housing to fold down into the closed position with the wrist support stowed. The panelled structure, as shown in FIGS. 6 and 7, are provided with an upper cutout 78 or slot to provide access to the controls 24 and 26 on the keyboard as in prior embodiments. Similarly, a lower slot 80 is formed in the lower edge of the panel 50 to enable access to control buttons, switches, or a floppy disk bay on the lower front panel of the lower housing. An opening 81 may also be provided to accommodate a control stick or button on some keyboards. Other openings may also be provided to access other controls and the like as they may appear on other computers.

Figure 10:
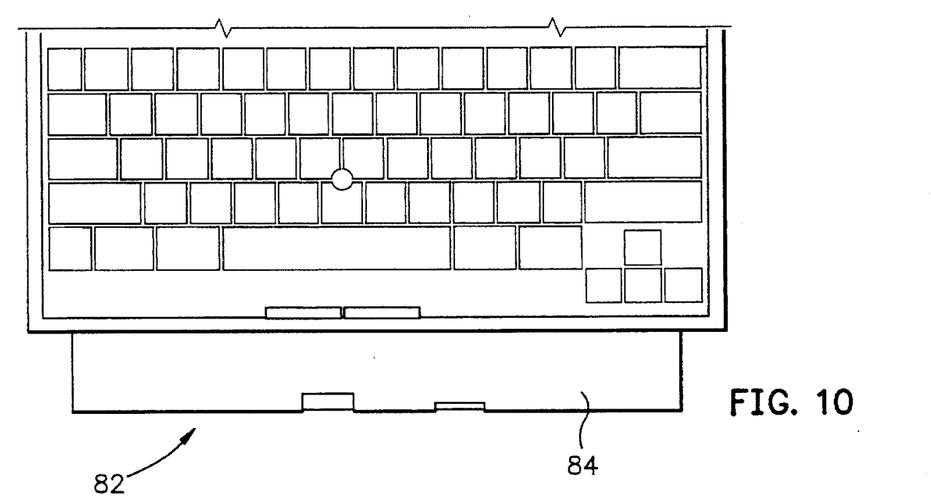
FIG. 10 is a top plan view illustrating a lap top computer with a further embodiment of the invention installed.
Figure 11:
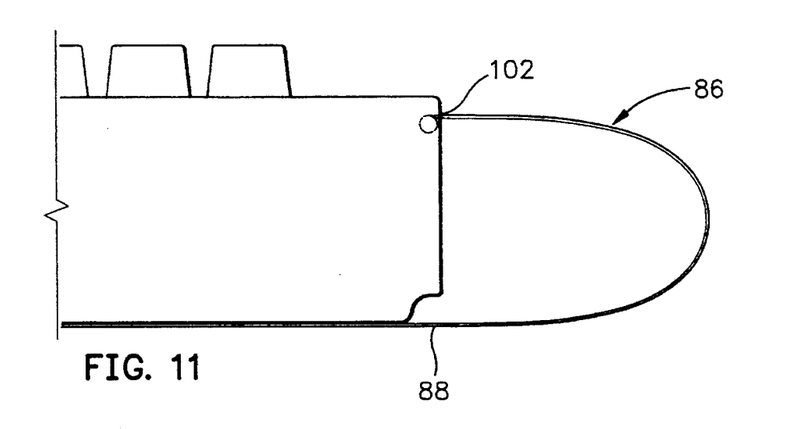
FIG. 11 is a side elevational partial view of the embodiment of FIG. 10 in the operative position.
Figure 12:
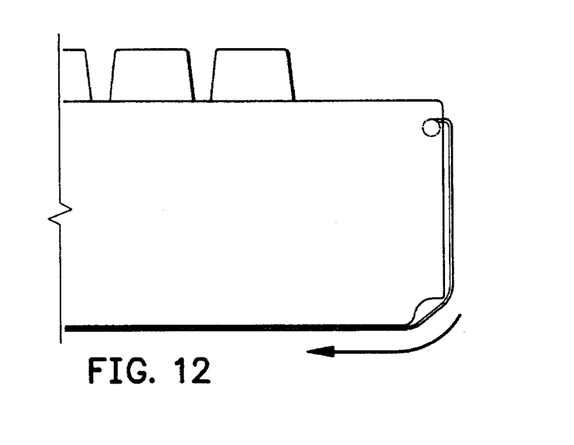
FIG. 12 is a view like FIG. 11, showing the embodiment of FIG. 10 in the stowed position.

Referring to FIG. 10 of the drawing, a further embodiment of the invention is illustrated wherein a wrist support designated generally by the numeral 82 comprises a generally rectangular flexible laminated sheet 84 mounted to a front portion of the lower computer housing to provide a generally planar top wrist support structure or surface 86 when in the extended position as shown in FIG. 11. A continuation of the sheet forms a lower support structure 88 extending beneath the front lower portion of the housing for stowage and for supporting the support surface 86 in the extended position. The wrist support assembly is retractable to stowed non-support position, as shown in FIG. 12 by sliding it beneath the housing. The panel 84 is preferably a laminate.

Figure 13:
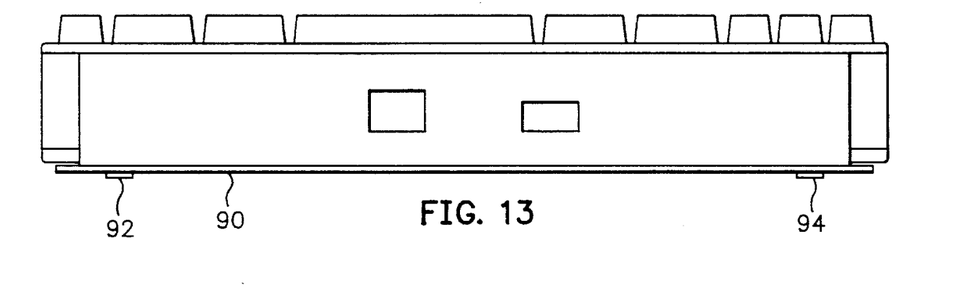
FIG. 13 is a front elevational view showing the embodiment of FIG. 10 in the stowed position.

The sheet, as shown in FIG. 13, is preferably a width slightly less than of the width of the lower computer housing and mounted such that a major portion of it slides underneath the bottom of the housing and is retained in place by a bracket or strap 90, held in place by a pair of screws 92 and 94 on the bottom of the housing of the computer. The strap 90 may also be a sheet that covers the bottom of the housing and covers the lower end 88 of the sheet when stowed.

Figure 15:
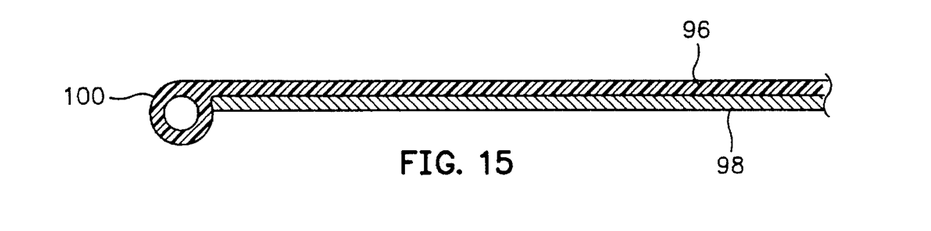
FIG. 15 is an enlarged side sectional drawing showing construction details of the embodiment of FIG. 10.

The sheet panel is formed as shown in FIG. 15, of an outer coating of polycarbonate 96 and an inner or bottom coating of spring steel 98. The thickness of the polycarbonate 96 is preferably on the order of about 0.2 mm. The upper end of the panel is provided with an enlarged bead 100 or the like, so that as shown in FIGS. 11 and 12, the sheet extends through a crack 102 between the keyboard support panel and the lower or front edge of the lower housing. The panel is fed through a slot as shown in FIG. 13, beneath the bracket or bar 90.

The crack 102 is a separation between the keyboard frame 120 and the lower housing 121 of the computer. For example, in the IBM Model 750 lap top computer, the keyboard frame is pivotally attached to the lower housing, enabling it to be raised like a hood from the lower housing. When the keyboard frame of the IBM Model 750 rests in the lower housing, there is a slight separation—a crack— through which the thin sheet panel can extend when the frame is received and retained in the lower housing. In this example, the bead 100 is retained within the computer, against the inside front surfaces of the keyboard frame 120 and lower housing 121.

Figure 14:
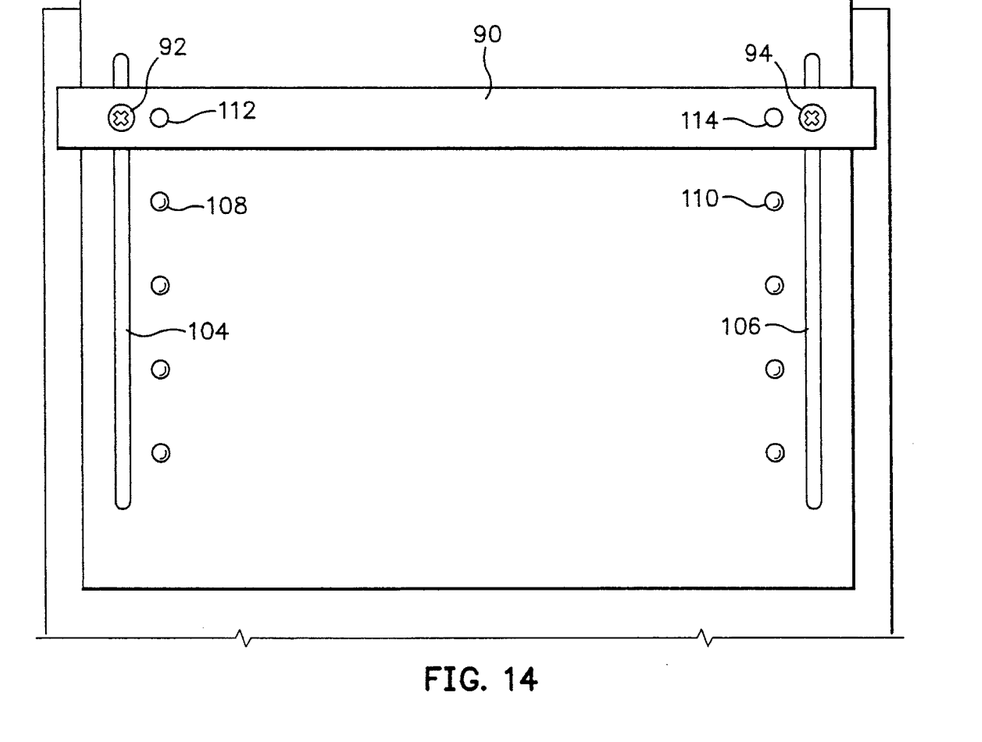
FIG. 14 is a bottom plan view showing the embodiment of FIG. 10 in the operative position.

As shown in FIG. 14, the sheet is formed with a pair of slots 104 and 106 extending along parallel opposite side edges thereof for guiding engagement with screws 92 and 94 to function as guides. The slots 104 and 106 are formed of a sufficient length to accommodate the full extension and retraction of the panel as shown in FIGS. 11 and 12.

The panel is preferably also formed with a detent mechanism to latch it in the respective and extended and retracted positions. The detent assembly comprises a series of holes or detents 108 on one side of the panel and holes 110 on the opposite side of the panel which register with bumps or knobs 112 and 114 on the guide bar or panel 90. These register with and latch into the respective holes in a typical detent type of function.

From the above descriptions and illustrations, it is seen that I have provided a wrist support assembly for lap top type of computers, wherein the wrist support structure is easily available and stowed with the computer without extra carrying space, and the like. The support assembly is easily assembled to the computer housing in proximate relation to the keyboard to enable its quick and effective use.

While I have illustrated and described my invention by means of specific embodiments, it is to be understood that numerous changes and modifications may be made therein without departing from the spirit and scope of the invention as defined in the appended claims.

I claim:

1. A stowable wrist support assembly for a portable computer of the type having an upper housing and a lower housing, said lower housing having a front edge and a back edge, said upper housing being pivotally connected to the back edge of the lower housing, the lower housing having top and bottom surfaces connected by a vertical peripheral side surface and having a keyboard disposed on the top surface, said support assembly comprising:

a generally thin flat panel having a generally planar top support surface and a rear edge formed with a lip for detachably engaging and latching at a location proximate to the front edge of the lower housing; and a panel support member extending downwardly from the underside of said thin flat panel for engaging the front edge of said lower housing for supporting said thin flat panel in an outwardly extending position substantially in the plane of the keyboard.

2. A wrist support according to claim 1 wherein said support assembly is stowable between said upper and lower housings when said upper housing is closed onto said lower housing.

3. A wrist support according to claim 2 wherein said panel support member comprises a brace member hinged to an underside of said thin flat panel and including a finger at an outermost end adapted for engagement with said lower housing.

4. A wrist support according to claim 3 wherein the underside of said thin flat panel comprises a recess having a shape for accommodating said brace member so that said brace member is stowable within said recess.

5. A wrist support according to claim 1 wherein said thin flat panel further comprises a front edge opposite said rear edge, said front edge having a front edge lip for increasing the stiffness of said thin flat panel, and wherein the lower housing includes a shoulder formed proximate to said front edge, and the rear edge of said thin flat panel is adapted for hooking over said shoulder.

6. A wrist support according to claim 5 wherein said front edge lip and said rear edge lip are spaced to extend between rows of keys on said keyboard for stowage of said thin flat panel on top of said keyboard.

7. A wrist support according to claim 1 wherein said support member comprises a thin flexible sheet and said brace member is a continuation of said flexible sheet that slideably extends below said lower housing for stowage.

8. A wrist support according to claim 7 wherein said flexible sheet comprises a laminate of polycarbonate and sheet metal.

9. A wrist support according to claim 7 wherein said lower housing includes an upper and a lower portion and a slot disposed therebetween, and wherein said rear edge of said support member extends through said slot.

10. A wrist support according to claim 7 further comprising detent means for maintaining said flexible sheet in selected extended and retracted positions.

11. A wrist support according to claim 1 wherein said support assembly further comprises a first panel defining said thin flat panel and a second panel defining said brace member, and said brace member is hinged to an outermost edge of said first panel and including an outermost edge adapted for latching engagement with a lower front edge of said lower housing.

12. A wrist support according to claim 11 wherein said first panel and said second panel have an underside that includes a plurality of recesses that match keys on said keyboard, said plurality of recesses for receiving said keys to enable stowage of said wrist support on top of said keyboard when said upper housing is closed onto said lower housing.

13. A wrist support according to claim 11 wherein one of said first and second panels comprises a slot and link members pivotally mounted in said slot and the other of said first and second panels includes a pin for latching said link members to situate said first and second panels in an angled relationship for engagement and support on said front edge of said lower housing.

14. A stowable wrist support assembly for a portable computer of the type having a bottom housing including a front edge, a back edge, spaced top and bottom surfaces connected by vertical peripheral side walls, a keyboard disposed on and substantially covering the top surface to the front edge, a shoulder formed proximate to said front edge, said portable computer including a top housing comprising a screen and hingeably mounted to the back edge of the bottom housing, said support assembly comprising:

a generally planar top support surface defined by a thin flat panel having a rear edge formed with a rear edge lip for detachably engaging and latching behind said shoulder; and a support member extending downwardly from said thin flat panel for engaging lower housing proximate to said front edge, said support member for supporting said thin flat panel in an outwardly extending position substantially in the plane of the keyboard.

15. A wrist support according to claim 14 wherein:

said thin flat panel comprises a front edge lip wherein said front edge lip and said rear edge lip are spaced to extend between rows of keys on said keyboard for stowage of said panel on top of said keyboard; and said support member comprises a brace member hinged to an underside of said thin flat panel and including a finger at an outermost end adapted for latching engagement with said lower housing, and said panel support member is stowable in a recess therein.

16. A wrist support according to claim 14 wherein said thin flat panel has an outer most edge and said support member is defined by a second panel having an outer edge and said second panel is hingeably connected on its outer edge to said outermost edge of said thin flat panel, said second panel including an inner edge adapted for engagement with said lower housing, wherein said first panel and said second panel have an underside that includes a plurality of recesses that match keys on said keyboard, said plurality of recesses for receiving said keys to enable stowage of said wrist support on top of said keyboard when said upper housing is closed onto said lower housing.

17. A wrist support according to claim 16 wherein one of said first and second panels further comprises a slot and link members pivotally mounted in said slot, and said other of said first and second panels comprises a pin latchably engagable with said link members for latching said first and second panels in an angled relationship for engagement and support on said front edge of said lower housing.

18. A wrist support according to claim 14 wherein said lower housing includes an upper and a lower portion and a slot disposed therebetween, and wherein said support panel comprises a thin flexible sheet, said rear edge of said support member extends through said slot and said support member is a continuation of said flexible sheet that slideably extends below said lower housing for stowage.

19. A wrist support according to claim 18 wherein said flexible sheet comprises a laminate of polycarbonate and sheet metal, and said sheet further comprises detent means for maintaining said sheet in selected extended and retracted positions.

20. A wrist support according to claim 3 wherein the keyboard includes keys arranged in rows and columns, and said wrist support further comprises a hinge that connects said thin flat panel with said brace member, wherein said hinge is positioned on said thin flat panel so that said hinge is situated between the keys when said upper housing is closed onto said lower housing.

* * * * *

UNITED STATES PATENT AND TRADEMARK OFFICE
CERTIFICATE OF CORRECTION

PATENT NO. : 5,570,268
DATED : October 29, 1996
INVENTOR(S) : E. J. Selker et al.

It is certified that error appears in the above-indentified patent and that said Letters Patent is hereby corrected as shown below:

On the title page, Item [75], --WALTER FRANZ BAIER--
       following "Edwin J. Selker".

Signed and Sealed this

Twenty-fifth Day of February, 1997

Attest:

BRUCE LEHMAN

*Attesting Officer*     *Commissioner of Patents and Trademarks*